(12) United States Patent
Pilard et al.

(10) Patent No.: US 8,588,049 B2
(45) Date of Patent: Nov. 19, 2013

(54) OPTICAL STORAGE MEDIUM COMPRISING A PHASE SHIFT COMPENSATION

(75) Inventors: Gael Pilard, Wankheim (DE); Herbert Hoelzemann, Villingen (DE); Dietmar Hepper, Hannover (DE); Stephan Knappmann, Zimmern ob Rotlweil (DE)

(73) Assignee: Thomson Licensing, Issy les Moulineaux (FR)

( * ) Notice: Subject to any disclaimer, the term of this patent is extended or adjusted under 35 U.S.C. 154(b) by 0 days.

(21) Appl. No.: 13/696,996

(22) PCT Filed: May 9, 2011

(86) PCT No.: PCT/EP2011/057406
§ 371 (c)(1),
(2), (4) Date: Nov. 8, 2012

(87) PCT Pub. No.: WO2011/141417
PCT Pub. Date: Nov. 17, 2011

(65) Prior Publication Data
US 2013/0058203 A1   Mar. 7, 2013

(30) Foreign Application Priority Data
May 10, 2010   (EP) .................................... 10305492

(51) Int. Cl.
*G11B 7/24* (2013.01)
(52) U.S. Cl.
USPC ...................................................... 369/275.4
(58) Field of Classification Search
None
See application file for complete search history.

(56) References Cited

U.S. PATENT DOCUMENTS

| 5,657,312 | A  | * | 8/1997  | Hayashi            | 369/275.3 |
|-----------|----|---|---------|--------------------|-----------|
| 7,499,389 | B2 | * | 3/2009  | Kim et al.         | 369/275.4 |
| 7,733,762 | B2 | * | 6/2010  | Fukuzawa et al.    | 369/275.4 |
| 8,018,823 | B2 | * | 9/2011  | Sasaki et al.      | 369/275.4 |
| 8,027,241 | B2 | * | 9/2011  | Knappmann et al.   | 369/275.3 |
| 8,223,620 | B2 | * | 7/2012  | Sakai et al.       | 369/275.4 |
| 2003/0214901 | A1 | * | 11/2003 | Koyama et al.   | 369/275.4 |
| 2005/0237912 | A1 | * | 10/2005 | Kikukawa et al. | 369/275.4 |

(Continued)

FOREIGN PATENT DOCUMENTS

| EP | 2299442 A1      | 3/2011  |
|----|-----------------|---------|
| JP | 2009238293 A    | 10/2009 |
| WO | WO2009109653 A1 | 9/2009  |

OTHER PUBLICATIONS

Search Rept:Aug. 18, 2011.

*Primary Examiner* — Peter Vincent Agustin
(74) *Attorney, Agent, or Firm* — International IP Law Group, PLLC (57) ABSTRACT

The optical storage medium comprises a substrate layer, a data layer having a pit/land data structure with data arranged in tracks on the substrate layer and a nonlinear layer with a super-resolution material, wherein the data structure comprises diffractive pits and lands having a size above an optical resolution limit of a pickup for reading of the data and super-resolution pits and lands having a size below the optical resolution limit, said pits and lands having a defined length with regard to a channel bit length. A diffractive land preceding a super-resolution pit is changed by a first length depending on the laser power of the pickup, and/or a diffractive pit preceding a super-resolution land is changed by the first length depending on the laser power of the pickup, to compensate a phase shift of the super-resolution pit, respectively super-resolution land.

12 Claims, 7 Drawing Sheets

(56) References Cited

U.S. PATENT DOCUMENTS

| | | | |
|---|---|---|---|
| 2009/0073862 A1* | 3/2009 | Shima et al. | 369/275.4 |
| 2009/0310456 A1* | 12/2009 | Pilard et al. | 369/53.21 |
| 2010/0027406 A1* | 2/2010 | Krause et al. | 369/275.4 |
| 2010/0091639 A1* | 4/2010 | Shima et al. | 369/275.4 |
| 2010/0142362 A1* | 6/2010 | Kurihara et al. | 369/275.4 |
| 2010/0220567 A1* | 9/2010 | Tajima et al. | 369/47.15 |
| 2011/0038248 A1* | 2/2011 | Fery et al. | 369/275.4 |
| 2011/0255385 A1* | 10/2011 | Knappmann et al. | 369/44.26 |
| 2013/0058203 A1* | 3/2013 | Pilard et al. | 369/275.4 |

* cited by examiner

OPTICAL STORAGE MEDIUM COMPRISING A PHASE SHIFT COMPENSATION

This application claims the benefit, under 35 USC. §365 of International Application PCT/EP2011/057406, filed May 9, 2011, which was published in accordance with PCT Article 21(2) on Nov. 17, 2011 in English and which claims the benefit of European patent application No, 10305492.0, filed May 10, 2010.

TECHNICAL FIELD OF THE INVENTION

The present invention relates to an optical storage medium comprising a substrate layer, a data layer and a nonlinear layer including a super-resolution material arranged above the data layer. The data layer comprises in particular pits and lands, or marks and spaces, having a size above an optical resolution limit and pits and lands, or marks and spaces, having a size below the optical resolution limit of a corresponding pickup for reading of the data as arranged on the data layer.

BACKGROUND OF THE INVENTION

Optical storage media are media in which data are stored in an optically readable manner, so that they can be read for example by means of a laser and a photodetector being integrated in a pickup. The detector is used for detecting reflected light of the laser beam when reading data from the storage medium. In the meanwhile a large variety of optical storage media are known, which are operated with different laser wavelength, and which have different sizes for providing storage capacities from below one Gigabyte up to 50 Gigabyte (GB). The formats include read-only formats such as Audio CD and Video DVD, write-once optical media such as CD-R and DVD-R, DVD+R, as well as rewritable formats like CD-RW, DVD-RW and DVD+RW. Digital data are stored on these media along tracks in one or more layers of the media.

The storage medium with the highest data capacity is at present the Blu-Ray disc (BD), which allows to store up to about 50 GB on a dual-layer disc. For reading and writing of a Blu-ray Disc an optical pickup with a laser wavelength of 405 nm and a numerical aperture of 0,85 is used. On the Blu-ray Disc a track pitch of 320 nm and a mark length from 2T to 8T or 9T is used, where T is the channel bit length and wherein 2T corresponds with a minimum mark length of 138-160 nm.

The diffraction based resolution limit of static optical instruments as described by the Abbe theory is about lambda/2NA, which would be 238 nm for a Blu-ray type pickup having a laser wavelength lambda=405 nm and a numerical aperture NA=0,85. For the read-out of the high frequency (HF) data signal of a rotating Blu-ray Disc, a resolution of twice that value can be obtained. This minimal detectable length according to the diffraction theory corresponds to a period of the pattern function, which is formed of a pit and of a land having the same length. Thus, the smallest detectable element of such a system is a pit or a land having a length of about lambda/4NA, which is 119 nm for a Blu-ray type pickup.

New optical storage media with a super-resolution material offer the possibility of increasing the data density of the optical storage medium by a factor of two to four in one dimension as compared with the Blu-ray Disc. This is possible by including a nonlinear layer, which is placed above a data layer of the optical storage medium, and which significantly reduces the effective size of the light spot used for reading from or writing to the optical storage medium. The nonlinear layer can be understood as a mask layer because it is arranged above the data layer and for some specific materials only the high intensity center part of a laser beam can penetrate the mask layer. Further, semiconductor materials can be used as a nonlinear layer, e.g. InSb, which show a higher reflectivity in the center part of the focused laser beam; this center reflectivity depends on the pit structure of the corresponding data layer. Therefore, the super-resolution effect allows to record and read data stored in marks or pits of an optical disc that have a size below the optical resolution limit of lambda/4NA of a corresponding optical pickup.

The nonlinear layer is often called a super-resolution near-field structure (SuperRENS) layer or super-resolution layer because it has been assumed that for some specific materials, the optical effect of reducing the effective spot size of the laser beam is based on a near-field interaction between the marks and spaces of the data layer and the nonlinear layer. SuperRENS optical discs comprising a super resolution near-field structure formed of a metal oxide, a polymer compound or a phase change layer comprising e.g. a GeSbTe or a AgInSbTe are known.

BRIEF SUMMARY OF THE INVENTION

The optical storage medium comprises a substrate layer, a data layer having a pit/land data structure with data arranged in tracks on the substrate layer, and a nonlinear layer with a super-resolution material disposed on the data layer, the data structure comprising diffractive pits and lands having a size above an optical resolution limit of a pickup for reading of the data and super-resolution pits and lands having a size below the optical resolution limit, which pits and lands have a defined length with regard to a channel bit length. A diffractive land preceding a super-resolution pit is changed by a first length depending on the laser power of the pickup, to compensate a phase shift of said super-resolution pit, and/or a diffractive pit preceding a super-resolution land is changed by the first length depending on the laser power of the pickup, to compensate a phase shift of said super-resolution land. Advantageously, the first diffractive land or diffractive pit following a sequence of super-resolution pits and lands is changed by a second length depending on the laser power of the pickup, in order to compensate for the phase shift of the sequence of super-resolution pits and lands.

In a preferred embodiment, the diffractive land preceding the super-resolution pit and the diffractive pit preceding the super-resolution land are extended by the first length, and the first diffractive land or diffractive pit following the sequence of super-resolution pits and lands is extended by the second length, wherein the first and the second length are the same.

In a further aspect of the invention, an average phase shift is provided for a sequence of 2T and 3T super-resolution pits and lands being calculated from the phase shift for the 2T super-resolution pits and lands and the phase shift for the 3T super-resolution pits and lands, or for a sequence of 2T and 3T super-resolution pits and lands a phase shift correction is provided including individually the phase shift for the 2T super-resolution pits and lands and the phase shift for the 3T super-resolution pits and lands.

The optical storage medium is in particular a read-only optical disc, the pits being molded or embossed on the surface of the substrate by using a respective stamper. But the invention can be applied also to recordable discs. For recordable discs, frequently the expressions "marks" and "spaces" are used instead of the expressions "pits" and "lands". The expressions "pits" and "lands" used in this application have to be understood correspondingly for also including recordable discs, and are not limiting the present invention to read-only discs.

During measurements performed on super-resolution optical storage discs, a surprising effect has been found in that the phase of the read-out signal of super-resolution pits and lands is changed with regard to the diffractive pits and lands. The phase shift in particular depends on the laser power of the pickup for reading the data, such that for a higher laser power the phase shift of the super-resolution pits and lands is larger with respect to the read-out signal of the reflective pits and lands. This laser power depending phase shift has been found in case of a super-resolution disc comprising an InSb semiconductor layer as the super-resolution material of the nonlinear layer, but a similar phase shift effect is expected also for other materials used for super-resolution optical storage media, e.g. phase change materials.

BRIEF DESCRIPTION OF THE DRAWINGS

Preferred embodiments of the invention are explained now in more detail below by way of example with reference to schematic drawings, which show:

FIG. 1 an optical storage medium in a sectional view with a layer stack comprising a substrate, a data layer and a nonlinear layer, FIG. 2 impulse responses for a super-resolution disc according to a first laser power and for a Blu-ray Disc, FIG. 3 magnitudes of transfer functions, obtained from the impulse responses shown in FIG. 2, FIG. 4 the phase information of the transfer functions, obtained from the impulse responses shown in FIG. 2, FIG. 5 the phase deviation for the measured impulse response as shown in FIG. 2, FIG. 6 impulse responses for a super-resolution disc according to a second laser power and for a Blue-ray disc, FIG. 7 magnitudes of transfer functions, obtained from the impulse responses shown in FIG. 6, FIG. 8 the phase information of the transfer functions, obtained from the impulse responses shown in FIG. 6, FIG. 9 the phase deviation for the measured impulse response as shown in FIG. 6, FIG. 10 read-out and simulation signals for a super-resolution disc according to the first laser power, FIG. 11 read-out and simulation signals for a super-resolution disc according to the second laser power, FIG. 12a, 12b first example for an NRZI signal without and with phase correction, FIG. 13a, 13b second example for an NRZI signal without and with phase correction, FIG. 14 simulated results for a first sequence of super-resolution pits and lands having a phase correction, FIG. 15 simulated results for a second sequence of super-resolution pits and lands having a phase correction, and FIG. 16 simulated results for a third sequence of super-resolution pits and lands having a phase correction.

DETAILED DESCRIPTION OF PREFERRED EMBODIMENTS

Figure 1:
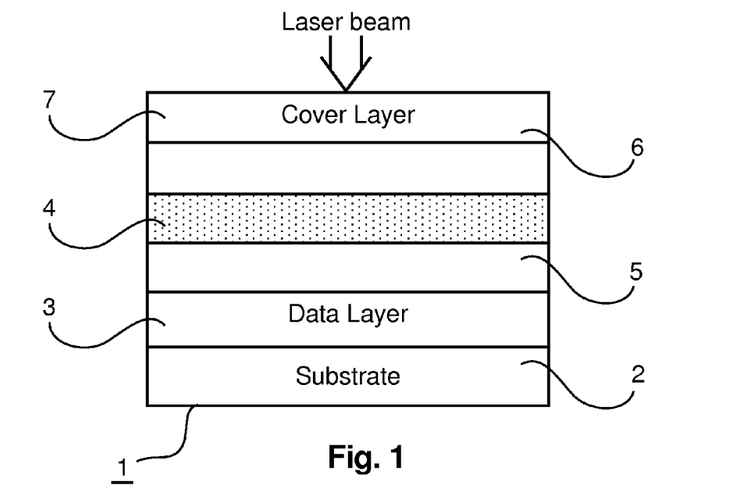

In FIG. 1 an optical storage medium 1 is shown in a cross section in a simplified manner. The optical storage medium 1 is in this embodiment a read-only (ROM) optical storage disc. On a substrate 2 a data layer 3 is arranged which may comprise a reflective metallic layer, for example an aluminum layer. The data layer 3 has a data structure consisting of pits and lands or marks and spaces arranged on essentially parallel tracks. For a ROM disc, the marks are molded or embossed as pits on the surface of the substrate 2 for representing the data layer 3. On the data layer 3 a first dielectric layer 5 is arranged and on the dielectric layer 5 a nonlinear layer 4 is arranged for providing the function of a mask layer for utilizing a super-resolution effect. The nonlinear layer 4 comprises in particular a super-resolution material for providing the super-resolution effect.

Above the nonlinear layer 4 a second dielectric layer 6 is disposed. As a further layer, a cover layer 7 is disposed on the second dielectric layer 5 as a protective layer. For reading the data of the data layer 3, a laser beam is applied in this embodiment from the top of the storage medium 1, penetrating first the cover layer 7. The optical storage medium 1 is in particular an optical disc having outside dimensions similar to BDs, DVDs and CDs. The first and second dielectric layers 5, 6 comprise for example the material $ZnS—SiO_2$. The substrate 2 and the cover layer 7 may consist of a plastic material, as known from DVDs and CDs. The layers of the storage medium 1 are arranged particularly as a layer stack. The nonlinear layer 4 comprises for example a semiconductor material of the III-V semiconductor family, e.g. GaSb, InAs or InSb, or a phase-change material, for example a chalcogenide material.

The super-resolution effect allows detecting marks that have a size, in particular a length, which is below the diffraction-based optical resolution limit of lambda/4NA of a corresponding apparatus for reading the data of the optical storage medium. It has been demonstrated that the super-resolution detection of an optical disc comprising a phase-change material or other materials such as semiconductor materials, is related to a local change of the optical properties of the non-linear layer 4. For phase-change materials, for example AgInSbTe, it is assumed that the temperature increase due to the focussed laser spot is responsible for the super-resolution effect, which provides an aperture only in a small center of the laser spot. This is a priori due to a low thermal conductivity and a strong optical non-linearity of the material.

This effect is also assumed for other chalcogenide materials, which comprise a chalcogenide element like sulphur, selenium, tellurium and one or several more electropositive elements like arsenic, germanium, phosphor or antimony. The chalcogenide materials are glasslike materials which show two stable phases, an amorphous and a crystalline phase. By heating a chalcogenide material with a high intensity laser beam, a phase transition from the crystalline to the amorphous phase is provided. For a super-resolution optical disc comprising a chalcogenide material, the intensity of the laser beam of a corresponding optical pickup is adjusted such that only for a small center part of the laser spot on the storage medium a phase transition is provided for providing an "aperture type" super-resolution effect.

Also super-resolution discs comprising a semiconductor material as the super-resolution material have been investigated, and in particular for III-V semiconductors having a low activation threshold, for example InSb, good results could be obtained. For the semiconductor materials, it is assumed that the high light intensity of a corresponding laser beam shifts electrons from the valence band to the conduction band, which increases the reflectivity of the semiconductor material. The change in reflectivity depends on whether a pit or a land of the data layer is present.

Recent experiments have shown that the HF signal read from super-resolution pit/land structures—pits and lands having a size equivalent or below the diffraction-based optical resolution limit of lambda/4NA of the optical read-out system—has a shift in phase with respect to the signal obtained from a diffraction-limited read-out of pits and lands having a length larger than the diffraction-based optical resolution limit of the read-out system.

The impulse response of the optical channel has been determined by reading a random pattern of pits and lands including all sizes from 2T to 8T, wherein T is a channel bit length of 40 nm, from a super-resolution disc using an InSb semiconductor layer as the super-resolution layer. The smallest pits and lands are 2T pits and lands with a length of 80 nm and 3T pits and lands with a length of 120 nm being at or below the optical resolution limit of lambda/4NA=119 nm of an optical Blu-ray type pickup for reading the data. The impulse response signal 21 of this super-resolution disc is depicted in FIG. 2, in which it is compared with a corresponding idealized impulse response signal 22 for this super-resolution disc and with an idealized impulse response signal 23 of a Blue-ray Disc comprising a random pattern of 2T to 8T pits in accordance with the Blu-ray Disc standard.

The impulse response signal 21 has been obtained from the measured data signal by using a finite impulse response filter with 39 taps, which filter coefficients have been varied such that the transfer function of the finite impulse response filter corresponds with the transfer function of the measured data signal. The ideal super-resolution impulse response signal 22 has been obtained by simply scaling the impulse response of the Blu-ray Disc system to the smaller miminum mark length of the super-resolution disc.

Figure 2:
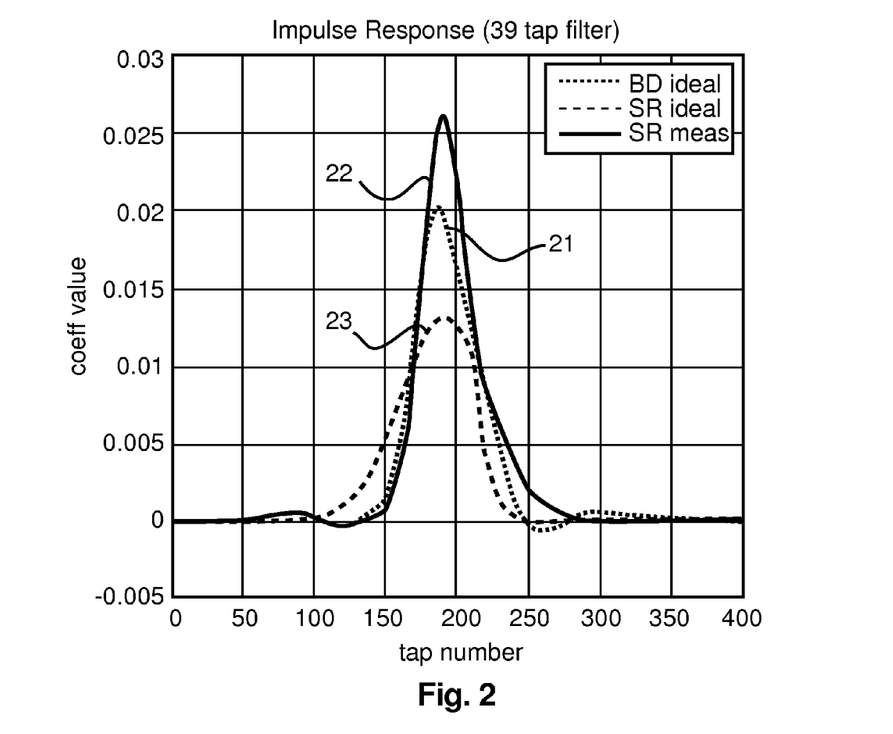
Figure 3:
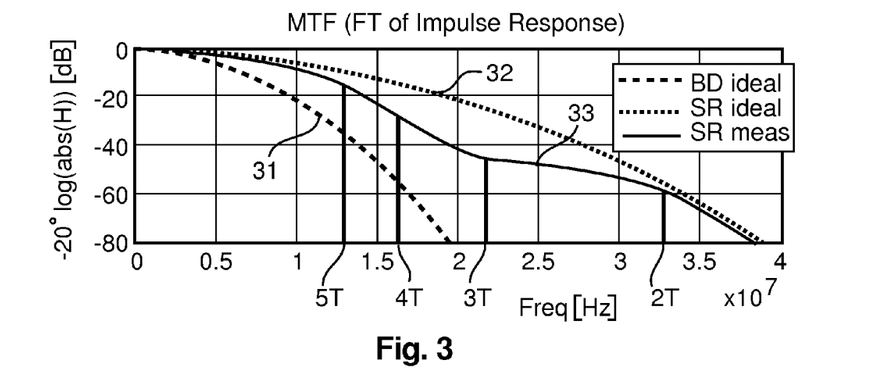

The magnitudes of the transfer functions obtained from the impulse responses by Fourier transform shown in FIG. 2 are depicted in FIG. 3. The transfer function 31 of a random Blu-ray Disc signal covers a frequency range between 0 and about 20 MHz. The transfer function 32 of the idealized super-resolution signal extends over a frequency range from 0 to about 38 MHz. The transfer function 33 based on the measured super-resolution signal extends also over the frequency range from 0 to about 38 MHz but shows a deviation in the frequency range of 10-30 MHz with regard to the ideal super-resolution transfer function 32 of the super-resolution disc.

Figure 4:
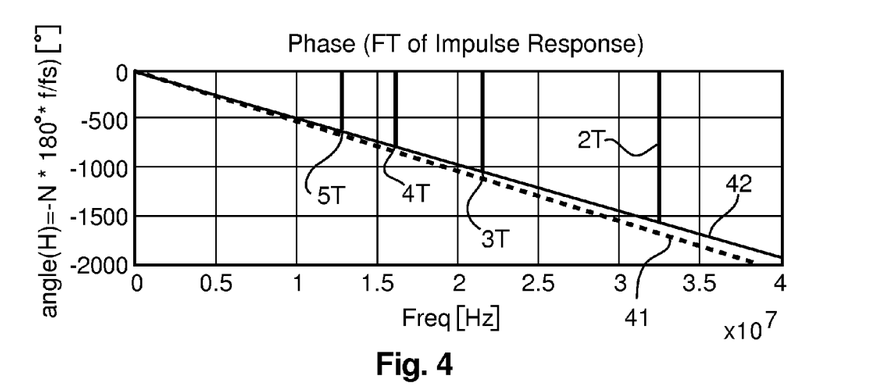

The magnitudes of the transfer functions 31, 32, 33 are obtained from the impulse response by performing a Fourier transform. The Fourier transform provides also the phase information of the transfer functions, which is shown in FIG. 4. The graph 41 shows the phase for the idealized super-resolution signal, transfer function 32. Graph 42 shows the phase for the measured super-resolution signal, transfer function 33, which shows a phase deviation in the high frequency range above 20 MHz for the measured super-resolution signal 42 with regard to the ideal super-resolution signal 41. In FIGS. 3 and 4, the respective locations for the 2T, 3T, 4T and 5T pits corresponding each to a single frequency are also indicated.

Figure 5:
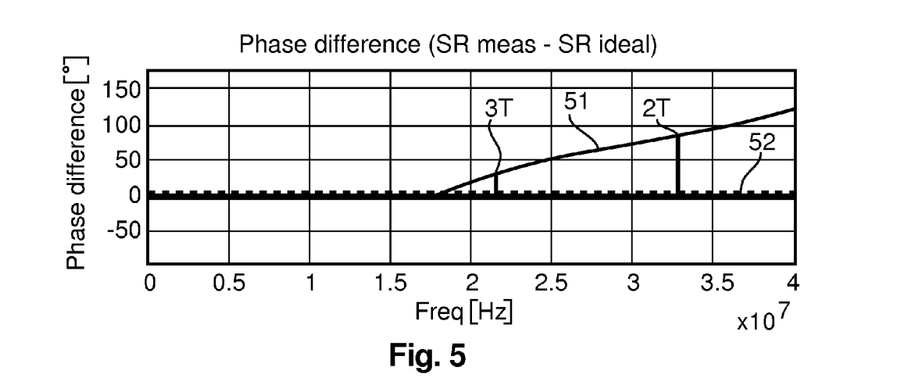

In FIG. 5, the phase deviation 51 for the measured super-resolution signal 42 is shown with regard to the ideal super-resolution signal, graph 41. Further, the locations of the 2T and 3T pits are indicated in FIG. 5. As can be seen from FIG. 5, the phase difference 51 is increasing for smaller pit sizes and there is surprisingly a phase advance of about 90° for the 2T pits, whereas the phase advance for the 3T pits is about 30 degrees. The phase shift of 90 degrees corresponds to a shift of 40 nm in terms of distance on the super-resolution disc.

For the read-out of the super-resolution disc, a Blu-Ray type optical pickup was used with a laser wavelength of lambda=405 nm and a numerical aperture of 0.85. A laser power of 2.3 mW was used for obtaining the measured impulse response of FIG. 2. An optical pickup of this type can read the 2T and 3T pits and lands on the super-resolution discs only by utilizing the super-resolution effect. The 2T and 3T pits are therefore called super-resolution pits and lands for the sake of simplicity in this application therefore. For reading of the 4T and 5T pits and lands and also the larger pits and lands, essentially a diffractive effect contributes to the data signal. 4T-8T pits and lands are therefore called diffractive pits and lands in this application.

Figure 6:
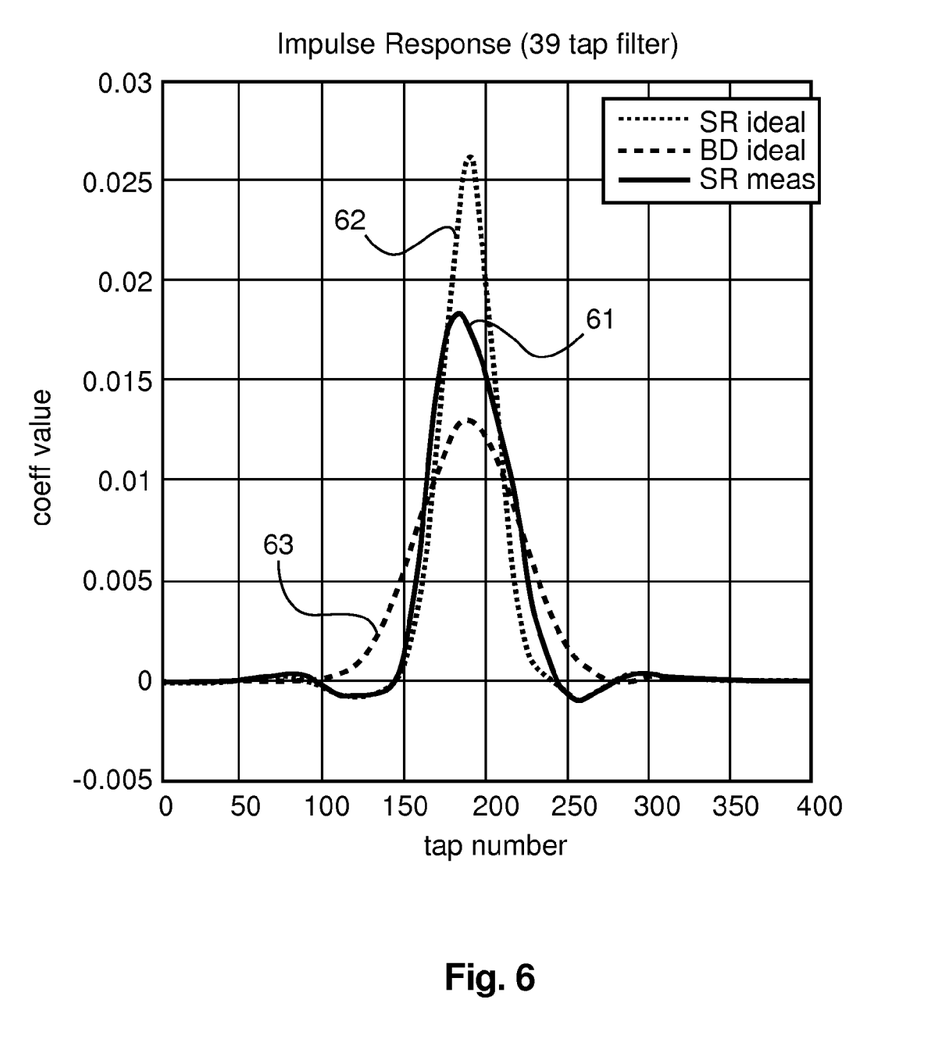
Figure 7:
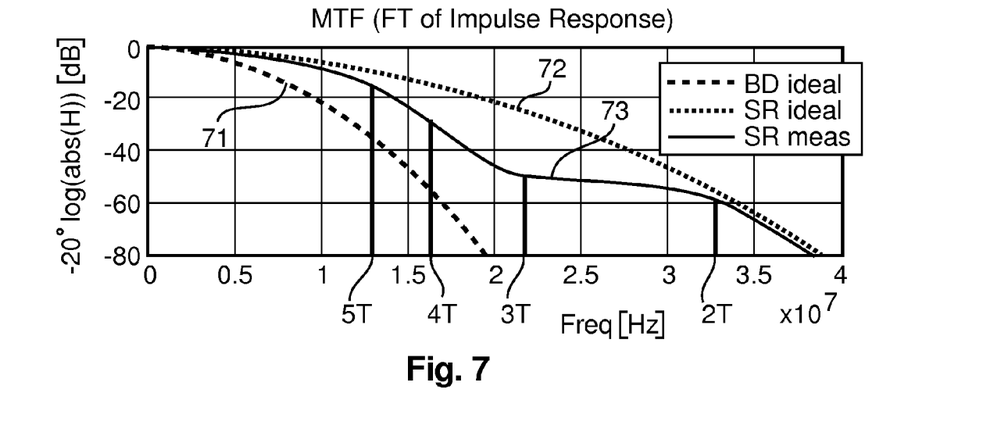
Figure 8:
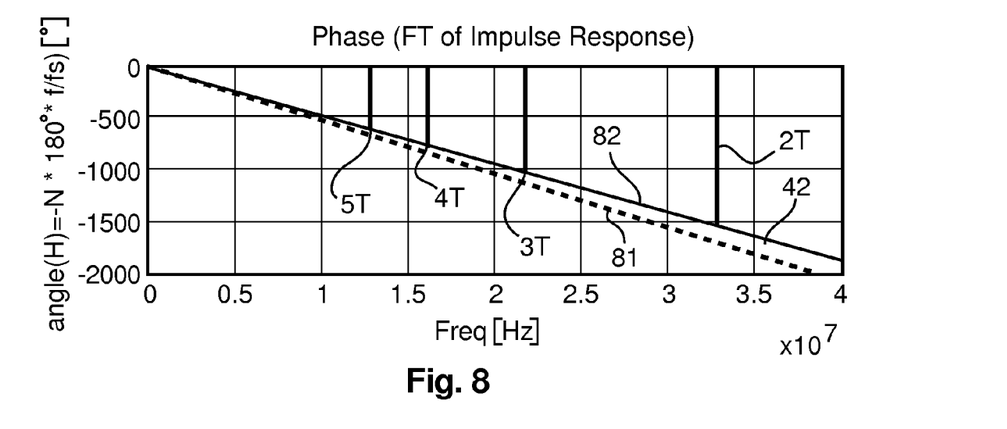

The super-resolution disc as used for obtaining the phase shift shown in FIGS. 4, 5 has been tested in addition by using a laser power of 2.8 mW for obtaining the HF data signal. The corresponding impulse response 61 obtained from the measured data signal is compared in FIG. 6 with the corresponding idealized super-resolution impulse response signal 62 and with an idealized impulse response signal 63 for a Blu-ray Disc. The transfer function magnitudes 71, 72, 73 shown in FIG. 7 correspond with the transfer function magnitudes 31, 32, 33 of FIG. 3 and the transfer function phase signals 81, 82, 91, 92 shown in FIGS. 8 and 9 correspond with the transfer function phase signals 41, 42, 51, 52 shown in FIGS. 4 and 5.

Figure 9:
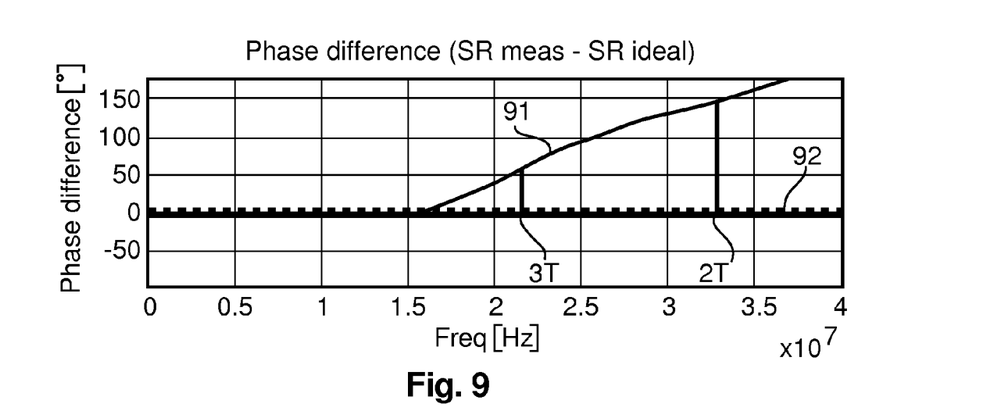

As can be seen from FIG. 9, the phase advance for the 2T and 3T pits and lands is larger for the higher read-out power of 2.8 mW with regard to the read-out power of 2.3 mW: for the higher read-out power of 2.8 mW, the phase advance is about 150 degrees for the 2T pits and about 60 degrees for the 3T pits. The higher the read-out power, the greater the phase advance will be therefore. One explanation could be a thermal effect, which allows explaining why the effect is bigger at higher power and why the phase advance is higher for small marks.

Figure 10:
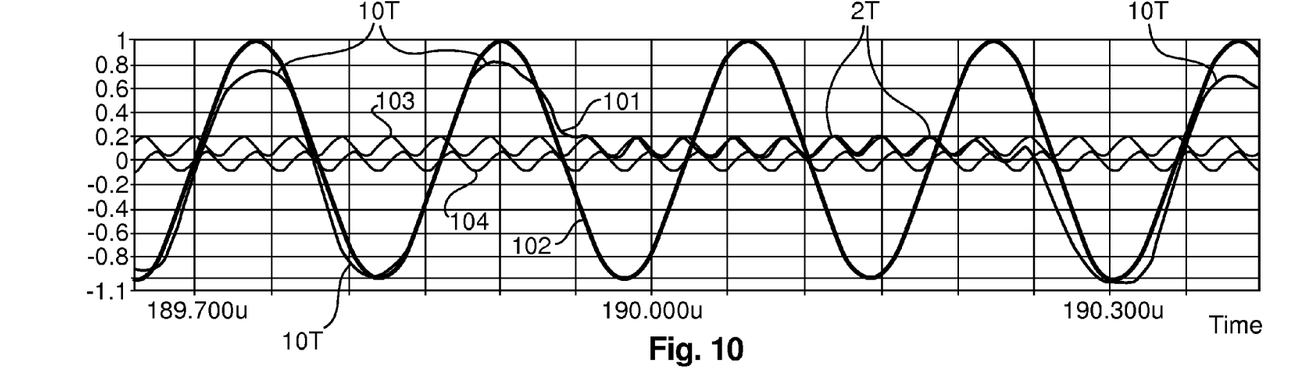

To confirm the results obtained from FIGS. 2-9, a super-resolution disc has been used similar to the super-resolution disc used for FIGS. 2-9, but including a data sequence comprising 10 pits of 80 nm each and each followed by a land of length 80 nm, the pits and lands corresponding to 2T super-resolution pits and lands. This sequence of super-resolution pits and lands is placed between 400 nm pits and lands corresponding to diffractive 10T pits and lands. FIG. 10 shows an HF signal 101 that has been obtained by using 2.3 mW laser power. To the 10T pits and lands a sine curve 102 has been fitted, neglecting the super-resolution pits and lands. To the 2T pits and lands another sine curve 103 has been fitted, neglecting the super-resolution pits and lands, graph 103 being in phase therefore with the 2T pits and lands of HF signal 101. Graph 104 has been obtained by fitting the 2T pits and lands with a sine curve being in phase with the 400 nm 10T signals. The phase difference between the sine curves 103, 104 results in a phase advance of 97°, the 2T pits and lands showing therefore a phase advance of 97° with regard to the 10T pits and lands, which is in agreement with the result obtained from FIGS. 4, 5.

Figure 11:
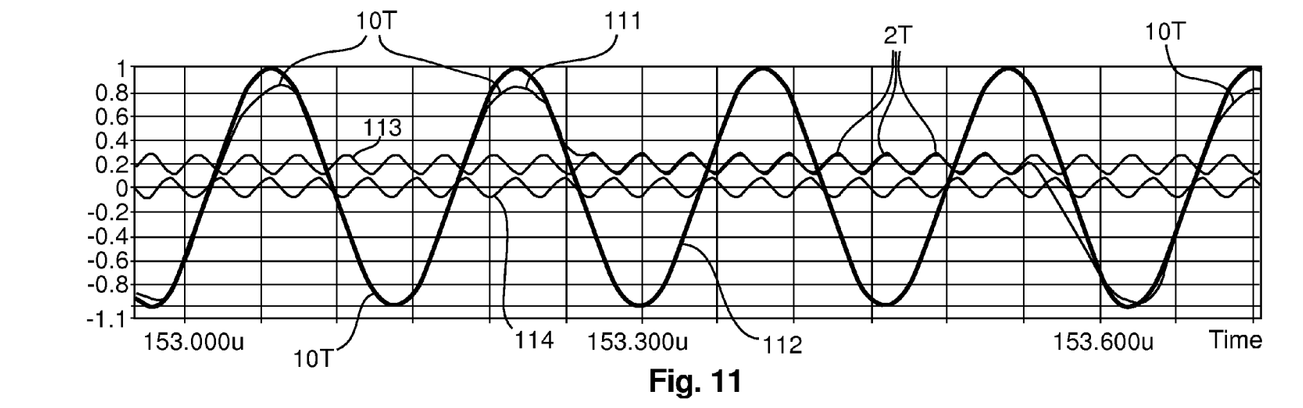

The same data sequence has been read from the super-resolution disc by using a laser power of 2.8 mW, and corresponding results are shown in FIG. 11. Curve 111 shows the measured HF signal. Curve 112 is a sine curve fitted to the 10T pits and lands of the measured HF signal, and curve 113 is a sine curve fitted to the actual 2T pits and lands of the measured HF signal. Curve 113 shows a phase advance of 166° with regard to the curve 114, which would have been expected for the 2T pits and lands if the signal of the 2T pits and lands would be in phase with the signal of the 10T pits and lands. The phase advance of 166° is close to the value of 150° obtained from FIGS. 8, 9.

The value of the phase shift depends on the length of a respective pit and the laser power used for the read-out, as described before, and depends further on the rotation velocity of the optical disc and the materials of the layer stack used to provide the super-resolution effect within the optical disc. For a compensation of this effect, it is proposed to produce an optical disc on which the small pits and/or lands, in particular the super-resolution pits and/or lands having a length smaller or equal to the optical resolution limit of a respective pickup for reading the data, are shifted by a specific amount along the scanning track in order to compensate the phase shift as caused by the super-resolution read-out.

According to a preferred embodiment of the invention, the falling edge of a diffractive land preceding a super-resolution pit is shifted by a defined length, depending on the length of the following super-resolution pit and the laser power to be used for reading the optical disc.

This shift has to be limited for practical reasons, in particular the jitter of the following pits and lands should not be essentially increased to avoid read-out errors of the pits and lands following the diffractive land. A shift of 1T appears to be an upper limit that should not be exceeded. The length of the preceding diffractive land is therefore extended to compensate the phase shift. Alternatively or in addition, the rising edge of a diffractive pit preceding a super-resolution land is shifted by a defined length, depending on the length of the following super-resolution land and the laser power to be used for reading the optical disc.

Figure 12A:
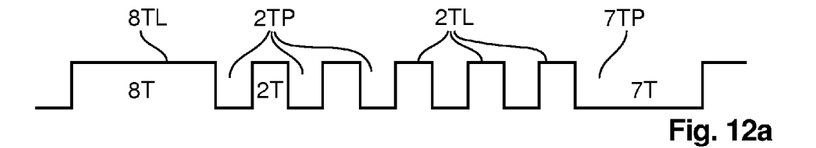
Figure 12B:
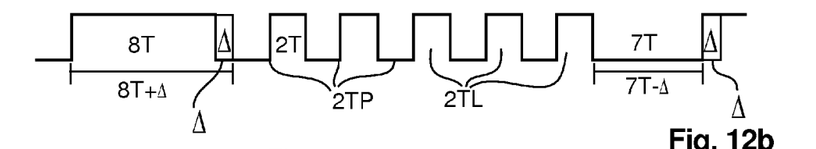

A preferred embodiment having a phase shift compensation of this kind for a super-resolution disc is shown is FIGS. 12a, 12b. FIG. 12a shows a sequence of pits and lands of a track of the super-resolution disc representing digital data that are encoded into an NRZI (Non-Return-to-ZeroInvert) signal according to a well known coding scheme represented by pits and lands ranging from e.g. 2T to 8T in length, wherein T is the channel bit length. FIG. 12a shows an example of an ideal, uncorrected NRZI HF signal comprising a sequence of five 2T pits 2TP, each separated by a 2T land 2TL. This sequence is preceded by a 8T land 8TL. After the last 2T pit follows a 2T land being followed by a 7T pit 7TP.

Due to the phase shift, the 8T land has to be extended by an additional length $\Delta$, as described before, for improving the read-out signal. The length of each of the 2T pits and lands 2TP, 2TL following the 8T land 8TL remain unchanged. In addition the 7T pit 7TP following the sequence of 2T pits and lands is shortened by the same amount $\Delta$, as shown in FIG. 12b. The data capacity of the optical disc is therefore unaffected and the clock period with regard to the channel bit length T is maintained throughout the track.

Figure 13A:
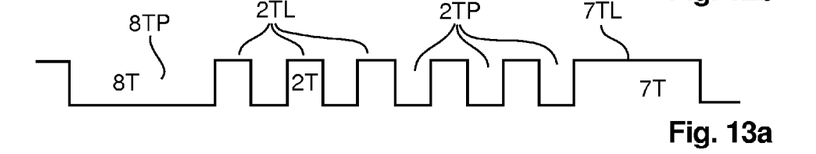
Figure 13B:
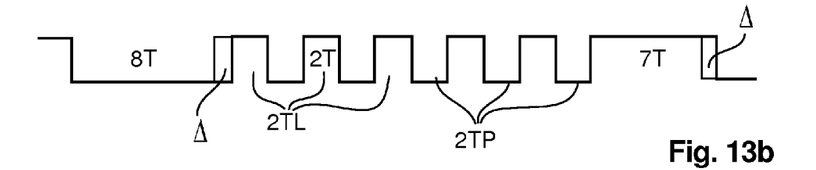

Another embodiment is shown in FIGS. 13a, 13b: FIG. 13a shows the original uncorrected NRZI signal for a sequence of five 2T lands 2TL, which are preceded by an 8T pit 8TP and which are each separated by a 2T pit 2TP. After the last 2T land follows a 2T pit being followed by a 7T land 7TL. To provide a correction of the phase shift, the 8T pit 8TP is extended by an additional length $\Delta$ shown in FIG. 13b, while the original length for the 2T land and 2T pits 2TL, 2TP is maintained. The 2T land and pits are therefore delayed by the amount $\Delta$ with regard to the clock cycle of this track. The first diffractive land or diffractive pit following the sequence of 2T lands and pits is shortened correspondingly by the same amount $\Delta$, which is in FIG. 13b the 7T land 7TL following the last 2T pit, so that the pits and lands following the 7T land 7TL remain in phase with the clock period.

The phase shift correction of the super-resolution pits and lands is therefore done in the following way: a diffractive pit or land before a first super-resolution pit or land will be extended by an additional length $\Delta$, which value corresponds to the phase difference detected and calculated from previous calculations based on the impulse response. For example an 8T land before a 2T pit will become an 8T+$\Delta$ land, and an 8T pit before a 2T land will become an 8T+$\Delta$ pit, when following a continuous sequence of super-resolution pits and lands.

The super-resolution pits and lands are therefore all shifted by the same amount $\Delta$ with regard to the clock period, so that all super-resolution pits and lands maintain the same length along the track direction. The amount $\Delta$ is compensated later with the first diffractive pit or land after the last super-resolution pit or land of the sequence, e.g. the 7T pit or 7T land will be shortened by the same amount $\Delta$ to become a 7T-$\Delta$ pit or land.

Figure 14:
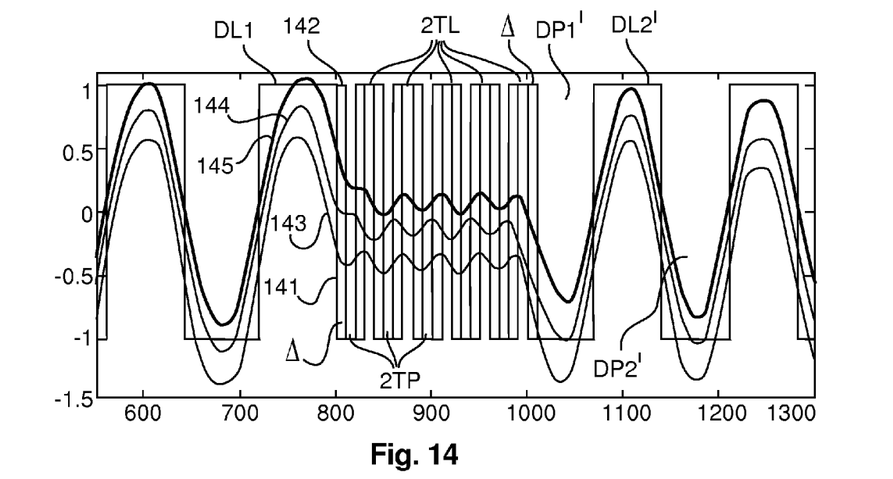

In FIG. 14 simulated results are shown for a phase shift correction performed for a sequence of five super-resolution 2T pits 2TP and lands 2TL, which are preceded by a diffractive land DL1, and after which sequence follows a diffractive pit DP1'. Graph 141 shows the uncorrected, original NRZI signal, and graph 142 the corrected NRZI signal, in which the length of the diffractive land DL1 is extended by a length $\Delta$ and the diffractive pit DP1' following the sequence of super-resolution 2T pits and lands is shortened by the same amount $\Delta$. The following diffractive land DL2' and pit DP2' after pit DP1' of the corrected NRZI signal are therefore in phase with the respective diffractive land and pit DL2', DP2' of the uncorrected NRZI signal 141.

The ideal read-out HF signal for the data sequence of graph 141 is shown by graph 143, according to which the signal of the 2T pits and lands is in phase with the uncorrected NRZI signal 141. Graph 144 shows a measured HF signal for this data sequence, which shows that the signal of the 2T pits and lands is not in phase with the NRZI uncorrected signal 141. Graph 145 shown a simulated HF signal for the corrected NRZI signal graph 142, which shows that the signal of the 2T pits and lands is in phase with the ideal 2T pit and land signal of graph 143. For better visibility, curves 143-145 have been shifted in FIG. 14 by different vertical offsets so that they can be distinguished easily. Therefore, by including the additional length $\Delta$ for phase shift correction, the HF read-out signal is essentially improved.

Figure 15:
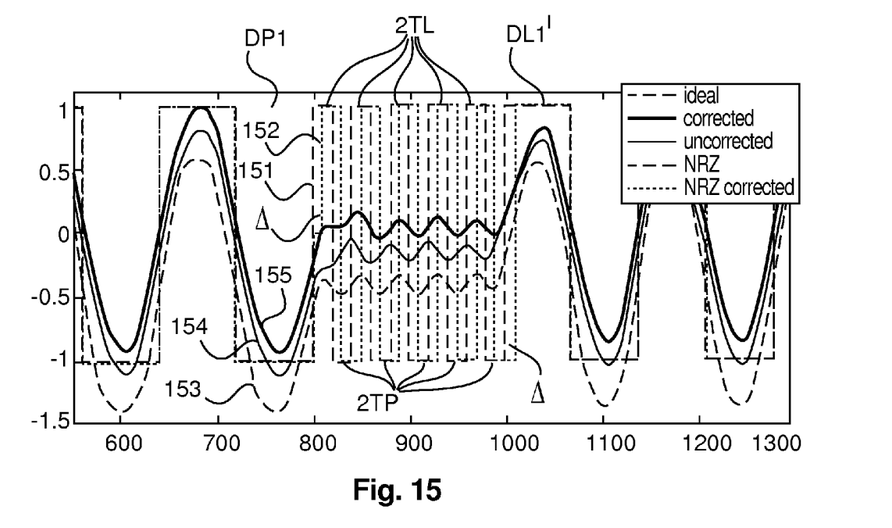

In FIG. 15 the situation is shown for a sequence of five 2T lands and pits 2TL, 2TP, which are preceded by a diffractive pit DP1, and after which sequence follows a diffractive land DL1'. Graph 151 is the uncorrected NRZI signal, and graph 152 the corrected NRZI signal which shows that the length of diffractive pit DP1 is extended by the amount $\Delta$ and that the length of diffractive land DL1' is shortened by the same amount $\Delta$. Graph 153 shows the simulated ideal HF read-out signal for the uncorrected NRZI signal of graph 151. Graph 154 shows the uncorrected, measured HF read-out signal. Graph 155 shows the HF read-out signal obtained by simulation for the corrected NRZI signal of graph 152. For better visibility, curves 153-155 have been shifted in FIG. 15 by different vertical offsets so that they can be distinguished easily.

Here again, the 2T lands and pits of the corrected HF signal 155 are in phase with the 2T lands and pits of the ideal HF signal 153. The phase shift that had occurred without using the present invention, shown by graph 154, has now been eliminated. The decoding of the super-resolution pits and lands is therefore essentially improved so that finally error-free decoding may be possible.

Figure 16:
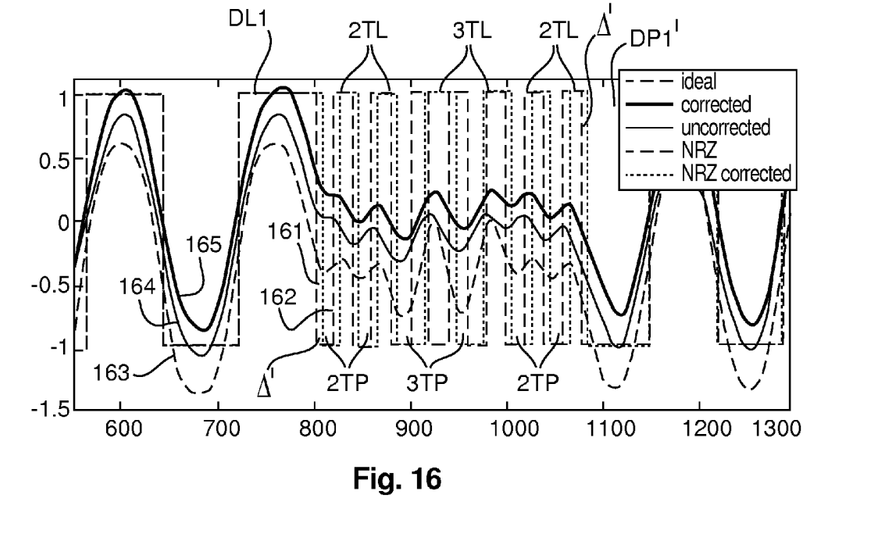

Another example for a phase shift compensation is shown is FIG. 16: graph 161 depicts an NRZI signal for a sequence comprising two super-resolution 2T pits and lands 2TP, 2TL which are followed by two super-resolution 3T pits and lands 3TP, 3TL, which again are followed by two 2T pits and lands 2TP, 2TL; this sequence of super-resolution pits and lands is preceded by a diffractive land DL1 and terminated by a diffractive pit DP1'. As explained before, for the 3T pits and lands, the phase shift is lower with regard to the phase shift of the 2T pits and lands, e.g. only 30° for a laser power of 2.2 mW, whereas for the 2T pits the phase shift is 90° for a laser power of 2.2 mW.

To provide a phase shift compensation for such a sequence of 2T and 3T super-resolution pits and lands, a mean value of both can be used, as shown in FIG. 16. Graph 162 depicts the corrected NRZI signal, for which an average phase shift of 60° has been used for the 2T and 3T super-resolution pits and lands. The length of the diffractive land DL1 has been extended by an additional length Δ' corresponding to the phase shift of 60°, and the length of diffractive pit DP1' has been shortened correspondingly by the same amount Δ'. Graph 163 shows a simulated ideal HF read-out signal for the uncorrected NRZI signal of graph 161. Graph 164 shows the measured HF read-out signal for the track containing this sequence of 2T and 3T super-resolution pits and lands, which is not in phase with the uncorrected NRZI signal 161. Graph 165 shows the HF read-out signal, as obtained by simulation, for the corrected NRZI signal represented by graph 162, being essentially in phase with the uncorrected NRZI signal 161.

Alternatively, for each 2T and 3T pit and land of the sequence of 2T and 3T super-resolution pits and lands as included in the NRZI signal 161, an individual phase shift of e.g. 90° for the 2T pits and lands and 30° for the 3T pits and lands can be used. This means that the first 2T pit of the sequence is shifted by 90° and the first 3T pit of the sequence is shifted back by 60° to get the optimum phase shift of 30° for the 3T pits and lands. The first 2T pit following the last 3T land is shifted by 60° to obtain again the total phase shift of 90° for the 2T pits and lands following the 3T pits and lands, and so on. This can be made for any sequence of 3T and 2T pits and lands, until a diffractive land or pit occurs, which will be shortened by the current overall phase shift of this sequence.

Also other embodiments of the invention may be utilized by a person skilled in the art without departing from the scope of the present invention. For other non-linear materials used for super-resolution discs, other phase-shift values may be obtained for the 2T and 3T super-resolution pits and lands according to a different super-resolution effect. Other super-resolution materials may even require a phase-shift compensation in the other direction such, that the length of the first diffractive land preceding a super-resolution pit is not extended but has to be shortened by a defined length to provide the correct phase-shift compensation, and the first diffractive land or diffractive pit following the shortened super-resolution land has to be extended by said defined length. The super-resolution pits and lands having a length below the optical resolution limit of a corresponding pickup are in particular 2T pits, 3T pits or 2T and 3T pits and lands, but they may have also any other length. The invention resides therefore in the claims herein after appended.

The invention claimed is:

1. Optical storage medium comprising
a substrate layer,
a data layer having a pit/land data structure with data arranged in tracks on the substrate layer, and
a nonlinear layer with a super-resolution material disposed on the data layer, wherein the data structure comprises diffractive pits and lands having a length above an optical resolution limit of a pickup for reading of the data and super-resolution pits and lands having a length below said optical resolution limit, said pits and lands having a defined length with regard to a channel bit length, characterized in that
a diffractive land preceding a super-resolution pit is changed by a first length depending on the laser power of the pickup, to compensate a phase shift of said super-resolution pit, and/or
a diffractive pit preceding a super-resolution land is changed by the first length depending on the laser power of the pickup, to compensate a phase shift of said super-resolution land.

2. Optical storage medium according to claim 1, wherein the first diffractive land or diffractive pit following a sequence of super-resolution pits and lands is changed by a second length depending on the laser power of the pickup, to compensate a phase shift of said sequence of super-resolution pits and lands.

3. Optical storage medium according to claim 2, wherein the first diffractive land or diffractive pit following the sequence of super-resolution pits and lands is extended by the second length.

4. Optical storage medium according to claim 1, wherein the diffractive land preceding the super-resolution pit and the diffractive pit preceding the super-resolution land are extended by the first length.

5. Optical storage medium according to claim 3, wherein the first and the second length are the same.

6. Optical storage medium according to claim 1, wherein for a sequence of 2T and 3T super-resolution pits and lands an average phase shift is provided calculated from the phase shift for the 2T super-resolution pits and lands and the phase shift for the 3T super-resolution pits and lands.

7. Optical storage medium according to claim 1, wherein for a sequence of 2T and 3T super-resolution pits and lands a phase shift correction is provided including individually the phase shift for the 2T super-resolution pits and lands and the phase shift for the 3T super-resolution pits and lands.

8. Optical storage medium according to claim 1, comprising further a cover layer above the nonlinear layer, the storage medium being designed for operation with a laser beam penetrating first the cover layer.

9. Optical storage medium according claim 8, comprising further a first dielectric layer arranged between the nonlinear layer and the data layer and a second dielectric layer arranged between the nonlinear layer and the cover layer.

10. Optical storage medium according to claim 1, wherein the diffraction-based optical resolution limit of the pickup for reading of the data is defined as lambda/4NA, lambda being a laser wavelength of the pickup and NA a numerical aperture of the pickup.

11. Optical storage medium according to claim 1, wherein the super-resolution pits and lands of a track having a size below the optical resolution limit are 2T and/or 3T pits and lands.

12. Optical storage medium according to claim 1, wherein the optical storage medium is a read-only optical disc or a recordable optical disc.

* * * * *